3,374,102
CROSS-LINKED CARBON PRODUCTS AND THEIR PREPARATION

Eugene Wainer, Shaker Heights, and Mark S. Vukasovich, Parma, Ohio, assignors to Horizons Incorporated, a corporation of New Jersey
No Drawing. Filed Feb. 1, 1963, Ser. No. 255,702
6 Claims. (Cl. 106—43)

This invention relates to carbon structures wherein atoms are cross-linked by small but significant amounts of certain elements which are deliberately intruded between some but not all of the carbon atoms in a body in which the carbon atoms are in an ordered and definite arrangement.

In an application for United States patent, Serial No. 243,277, filed December 10, 1962, and which is United States Patent 3,269,802 issued on August 30, 1966, we have described the preparation of carbon bodies in which a stoichiometric amount of certain carbide forming elements is reacted with a carbon matrix to produce filaments, solid blocks and foams or porous bodies, woven, felted and other unwoven bodies of carbide. Although the products described in the aforesaid patent application possess outstanding properties their utility is limited by their brittleness, and the absence of any appreciable flexibility or resilience in almost all of the products.

The present invention is directed to composite products consisting of carbon cross-linked with suitable amounts of certain elements, which products possess many of the desirable properties which are characteristic of the carbide products described in our earlier application and which are in addition less brittle and more robust, less rigid and more flexible and hence are useful in applications for which the carbide products described in our earlier application are not entirely satisfactory. The present invention is also directed to the process whereby such products are produced.

Briefly the process by which the novel products of this invention are produced comprises the introduction of certain elements in amounts up to about 25 mol percent of the total carbon content, into a carbon matrix with suitable properties and it may include the preparation of such a matrix by the carbonization of readily available carbonizable starting materials, e.g. as described in our above-noted application.

Since it represents a preferred embodiment the invention will be described with reference to the preparation of a flexible product from rayon cloth by the carbonization of the cloth and the introduction of titanium atoms into the carbonized product, but it is to be understood that the invention is not to be construed as to be limited to this embodiment.

The starting material may be an individual filament such as a thread of cotton, rayon, rubber or other carbonizable material, or it may be a cloth woven from filaments or strands of carbonizable materials, or it may be an aggragate of individual carbonizable filaments in which the filaments are randomly oriented, such as paper or other felted fiber masses, or it may be a composite of carbonizable and non-carbonizable material, such as metal reinforced cloth or other materials of like nature, or it may be a foamed or porous structure which is capable of being carbonized, such as phenolic, neoprene, rubber or other synthetic organic foams or the starting material may be a carbonaceous body derived by carbonization of an organic material, or the carbonaceous body may be carbon or mixtures of carbon and carbonizable materials that have been fabricated into a shape and structure for the purpose of conversion to the novel carbide-carbon products of this invention.

The techniques for carbonizing such materials are known. Any of a number of procedures may be followed in this portion of the process without departing from the intended scope of the invention. Known procedures usually involve heating carbonizable material at elevated temperatures in non-oxidizing atmospheres to distill off volatiles and degrade or decompose the organic material into carbon, for example, as described in the above-noted United States Patent 3,269,882 issued to us on August 30, 1966.

Thus in the preferred instance a woven fabric or roving composed of cellulose is heated in a controlled atmosphere under a heating schedule such that the organic structure is pyrolized completely to carbon. When the starting material is regenerated cellulose, e.g. viscose or rayon fiber, which can be shown by suitable analytical techniques to consist of a diagonal screw concourse with repeated patterns every 10.3 angstrom units, and the distance between the carbon atoms in the glucose units making up the unit cells is 1.54 angstrom units, four glucose units being required for each unit cell. On complete pyrolysis the distance between carbon atoms is maintained at 1.54 angstrom units and it seems probable that in the pyrolized product the carbon atoms are still arranged in the shape of a screw or spiral, the extension and retraction of which accounts for the flexibility in the pyrolized product, which is amorphous and not graphitic carbon if properly prepared.

Furthermore in the case of cellulose, the unit cells are arranged in the screw or spiral form, and are related to their neighbors with which they are intertwined. As a consequence of this background it will be appreciated that the choice of suitable atoms for cross-linking the carbon atoms, i.e. by the intrusion of non-carbon atoms into the amorphous carbon pyrolysis products is restricted to those elements whose ionic radius or crystal radius (Pauling) is smaller than 0.77 angstrom units. On this basis the following elements are suitable for cross-linking of the type indicated: boron, aluminum, silicon, vanadium, chromium, molybdenum, manganese, niobium, and titanium. Zirconium with a crystal radius of 0.80 angstrom units appears to be slightly too large, for intrusion and cross-linking by the process herein described.

Because titanium represents a preferred species, the following example will describe the practice of this invention with titanium as the cross-linking element but it is to be understood that by suitably modifying the operating conditions, the process may be practiced with any of the elements noted above, or with mixtures of said elements.

Briefly the method preferred is to heat a carbonizable cloth in a hydrogen, noble gas or inert atmosphere, or in vacuo which is free from oxidizing contaminants which would oxidize or react with and destroy the desired pyrolysis product. The temperature is usually in excess of about 1050° C. and the furnace is maintained at one atmosphere pressure. The cloth being processed is supported on a carbon block or between two carbon blocks. Small quantities of a vaporized titanium compound are bled into the selected atmosphere. For the cross-linking step temperatures well above 1050° C. are preferred, a temperature of about 1400° C. having been found particularly suitable with titanium. For the other elements disclosed above temperatures between about 2500° F. and 2700° F. or about 1350°–1500° C. have been found suitable. At the indicated temperatures each of the elements may be brought into contact with suitable carbonized material by passing a vapor containing a compound such as a halide of said element, in an atmosphere of dried hydrogen, noble gas or inert gases, mixtures of these, or in vacuo, for a time sufficient to effect the intrusion of up to about 25 mol percent of said elements based on the amount of carbon. The resulting products were flexible to almost the same extent as the starting material and much more so than the carbides themselves.

Instead of introducing the cross-linking element as a vaporized compound, it is also possible to introduce it into the carbonized material by cementation, e.g. by packing the carbonized material in powdered metal and passing active HCl gas through the powders so as to form the metal compound adjacent the zone in which it is used.

It is also possible to intrude two different elements either simultaneously or successively without impairing the resilience and flexibility characteristic of the products of this invention, provided that the amount of cross-linking element intruded does not exceed 25 mol percent.

The use and performance of organic resin bonded filamentary materials for the manufacture of rocket missile components such as nose cones, heat shields, rocket cases, and motors, is well known. Two-phase (fiber and matrix) structural composites for use in these hyperthermal environments have proved highly successful because of their unique high specific strength, insulative value, low weight, and inherent capability to erode sacrificially at the surface absorbing large quantities of thermal energy. However, the resin-fiber combination is subjected under use to conditions of excessive forces involving temperature, mechanical stress, abrasion, and profound chemical attack. The first manifestation of the application of such forces is the pyrolysis of the organic portions of the composite and the relatively complete decomposition of these organic portions, down to a very loosely bonded carbon matrix through which the filamentary filler is dispersed. As gas continues to be formed and as the process of ablation proceeds, the loose carbon regulus may be forcibly ejected from the structure, leaving a bare filament exposed substantially unbonded. As a result of the loss of important portions of physical material from the structure, the structure may eventually be destroyed.

By the practice of the present invention it becomes feasible to protect such materials from the catastrophic effects which occur when they are utilized in hyperthermal environments.

Thus by incorporating a suitable amount of carbide forming elements whose crystal radius is less than 0.77 angstrom units, into an organic matrix, the cross-linking described above will take place as pyrolysis of the organic matrix occurs, but instead of a loose carbon regulus being formed, it will now be tight and rigid as a result of the action of the carbide forming material binding one particle of carbon to another. Further, since within its structure there is the mechanism for bind, the elevated temperature permits the regulus or matrix then to be bonded to the fiber itself, thus creating a structure which retains a high degree of integrity when subjected to the extreme conditions of stress and temperature in service.

The chemistry of the carbon body strengthening then is the same as that described for carbon filament strengthening. A carbide-former of crystal radius less than 0.77 angstrom units, which permits carbon particles to be bonded to each other through the formation of metal carbide intrusion under neutral or reducing conditions, is the required strengthening agent.

Thus it will be seen that the present invention provides a means by which these composite structures can be made even more effective than they presently are, even under the most severe conditions of temperature and atmosphere, since it provides not only an improvement in initial properties but imparts to the composite the ability to withstand severe mechanical and thermal forces upon continued or repeated exposure to such environments. This means that the fiber reinforced structure, strengthened by the means of this invention, will perform satisfactorily during its initial function, and retain its integrity so as to insure stability during a second hyperthermal, mechanical stress period.

This is not a composite structure in the usual sense where a fiber is used to physically reinforce an organic matrix, since it includes one or more carbide formers incorporated in amounts not exceeding 25 mol percent, in an organic matrix wherein they serve a very useful function. The carbide former is incorporated uniformly throughout the organic matrix and preferably as a compound that can on being subject to heat and when in close proximity to carbon react to form a useful metal carbide by the mechanisms described above. Particularly useful compounds of the carbide former are halides and organic compounds wherein one constituent is the carbide forming element having a crystal radium smaller than 0.77 angstrom units.

When such a composite is formed into articles which are to be subjected to a hyperthermal environment it can undergo a metamorphic synthesis. The composite is degraded thermally in use and especially on the surface in contact with hot exhaust gases by frictional heating, and like causes. The surface immediately below the ablating or degrading outermost surface begins to char. It chars because it is not in an oxidizing atmosphere and because it is a carbonizable organic structure, not a melting type organic structure. In presently known fiber reinforced organic composites, this char or carbon skeleton is quite weak structurally. The present invention provides a built-in mechanism to greatly strengthen this charring layer, make it somewhat more oxidation resistant, harder, and possessing a continuous network as opposed to the loose char heretofore produced in the absence of any deliberately added carbide forming element of suitable size.

Under the conditions of high temperature in the composite immediately under the surface in contact with the hyperthermal environment, the carbide former reacts with the carbonaceous char layer to convert it to a hard metal carbide which imparts the properties described above to this sub-layer.

For example, a composite of organic filament (cellulose) and organic matrix is prepared containing a metal which forms a carbide cross-linking agent in less than stoichiometric amounts. When subjected to sufficient heat, the latter is vaporized by the heat transmitted into and through the composite and when a portion of the composite has been converted to a carbonized or carbon-containing bulk, the carbide-former reacts with the carbon or carbonized material and strengthens the carbon bulk by the described cross-linking mechanism. This action continues as more and more composite is carbonized and vaporized carbide-former is introduced to this carbon under the proper thermal conditions for carbide formation.

Having now described preferred embodiments of the invention, other modes of practicing the invention will be suggested by this description to those skilled in the art and hence it is not intended that the invention be limited except as required by the claims which follow.

We claim:
1. In a method of strengthening carbonized organic material selected from the group consisting of carbonizable filaments and products consisting of woven, nonwoven or felted carbonizable filaments without sacrificing the flexibility of said material by embrittling the resulting product, said method including carbonization of said organic material by heating said material to a temperature and in an atmosphere such that the non-carbonaceous constituents present are distilled off from said carbonizable material while said carbonizable material is supported in a manner such that the physical shape and ordered structure of the original material are retained; and thereafter strengthening said resulting carbonized product by carbiding said material; the improvement which consists in converting only up to 25 mol percent of said carbonized product to carbide of at least one element selected from the group consisting of carbide forming elements having an atomic radius not appreciably larger than 0.77 angstrom units, by heating said carbonized material to a temperature in excess of 1050° C. in an atmosphere containing as vapor a compound selected from the group consisting of halides and carbonyls of said carbide forming element which would react with said carbonized material under the conditions prevailing during said conversion to carbide; and continuing said conversion for a time sufficient for up to about 25 mol percent of said element to intrude into the ordered carbonized product and to cross-link the same.

2. The method of claim 1 in which the conversion of the starting material to carbide is begun prior to the completion of the carbonization step.

3. The process of claim 1 wherein the non-carbon carbide forming element is an element selected from the group consisting of boron, silicon, titanium, vanadium, niobium, tantalum, chromium, molybdenum, and aluminum.

4. The process of claim 1 wherein the vapor compound is a halide of said element.

5. The process of claim 1 wherein the atmosphere is selected from the group consisting of hydrogen, inert gas, mixtures of hydrogen and inert gases, and vacuum.

6. A strengthened flexible carbonized article consisting of carbonized material retaining an ordered structure and containing up to 25 mol percent of a carbide forming element having an atomic radius not larger than 0.77 angstrom units cross-linking some of the carbon atoms in said carbonized material.

References Cited

UNITED STATES PATENTS

| | | | |
|---|---|---|---|
| 3,022,190 | 2/1962 | Feldman | 117—37 |
| 3,061,465 | 10/1962 | Norman et al. | 117—107.2 |
| 3,066,822 | 12/1962 | Watter | 102—92.5 |
| 3,097,962 | 7/1963 | Whitacre et al. | 117—107.2 |
| 3,174,895 | 3/1965 | Gibson | 161—259 |
| 3,178,308 | 4/1965 | Oxley et al. | 117—107.2 |
| 3,210,233 | 10/1965 | Kummer et al. | 161—68 |

HELEN M. McCARTHY, *Primary Examiner.*